United States Patent [19]

Mohnach et al.

[11] 4,324,019
[45] Apr. 13, 1982

[54] WINDSHIELD WIPER CONNECTING PIN ADAPTOR

[75] Inventors: Michael G. Mohnach; William H. Harbison, both of Valparaiso, Ind.

[73] Assignee: The Anderson Company of Indiana, Gary, Ind.

[21] Appl. No.: 230,970

[22] PCT Filed: May 13, 1980

[86] PCT No.: PCT/US80/00573
§ 371 Date: May 13, 1980
§ 102(e) Date: May 13, 1980

[87] PCT Pub. No.: WO81/03308
PCT Pub. Date: Nov. 26, 1981

[51] Int. Cl.³ .................................................. B60S 1/40
[52] U.S. Cl. .................................................. 15/250.32
[58] Field of Search ............ 15/250.31, 250.32, 250.33, 15/250.35, 250.42; 403/163

[56] References Cited

U.S. PATENT DOCUMENTS

| 3,179,969 | 4/1965 | Glynn | 15/250.32 |
| 3,733,642 | 5/1973 | Schmid | 15/250.32 |
| 4,118,825 | 10/1978 | Hoebrechts et al. | 15/250.32 |
| 4,224,001 | 9/1980 | Arndt et al. | 15/250.32 |
| 4,261,074 | 4/1981 | Bauer et al. | 15/250.35 |

FOREIGN PATENT DOCUMENTS 2302889  10/1976  France ................... 15/250.32

*Primary Examiner*—Peter Feldman
*Attorney, Agent, or Firm*—Wegner, Stellman, McCord, Wood & Dalton

[57] ABSTRACT

In a windshield wiper assembly (10), a connecting adaptor (14) converts a center mounted pin connection between a wiper arm (11) and a pressure-distributing yoke (13) to a side mounted pin connection. In assembled position, the connecting adaptor (14) is disposed over the cross rivet (28) within a center open space (20) defined by the yoke (13). The connecting adaptor (14) has deflectable claw elements (42,43) with tabs (44,45) which engage the bottoms (48,49) of the shoulders (22,23) of the yoke (13) and flanges (54,55) which engage the tops of the shoulders (22,23) to fixedly maintain the connecting adaptor (14) in proper assembled position. A connecting pin (33) carried by the connecting adaptor (14) and extending laterally outward therefrom provides a side mounted pin connection for pivotally receiving the terminal end (68) of the wiper arm (11).

8 Claims, 5 Drawing Figures

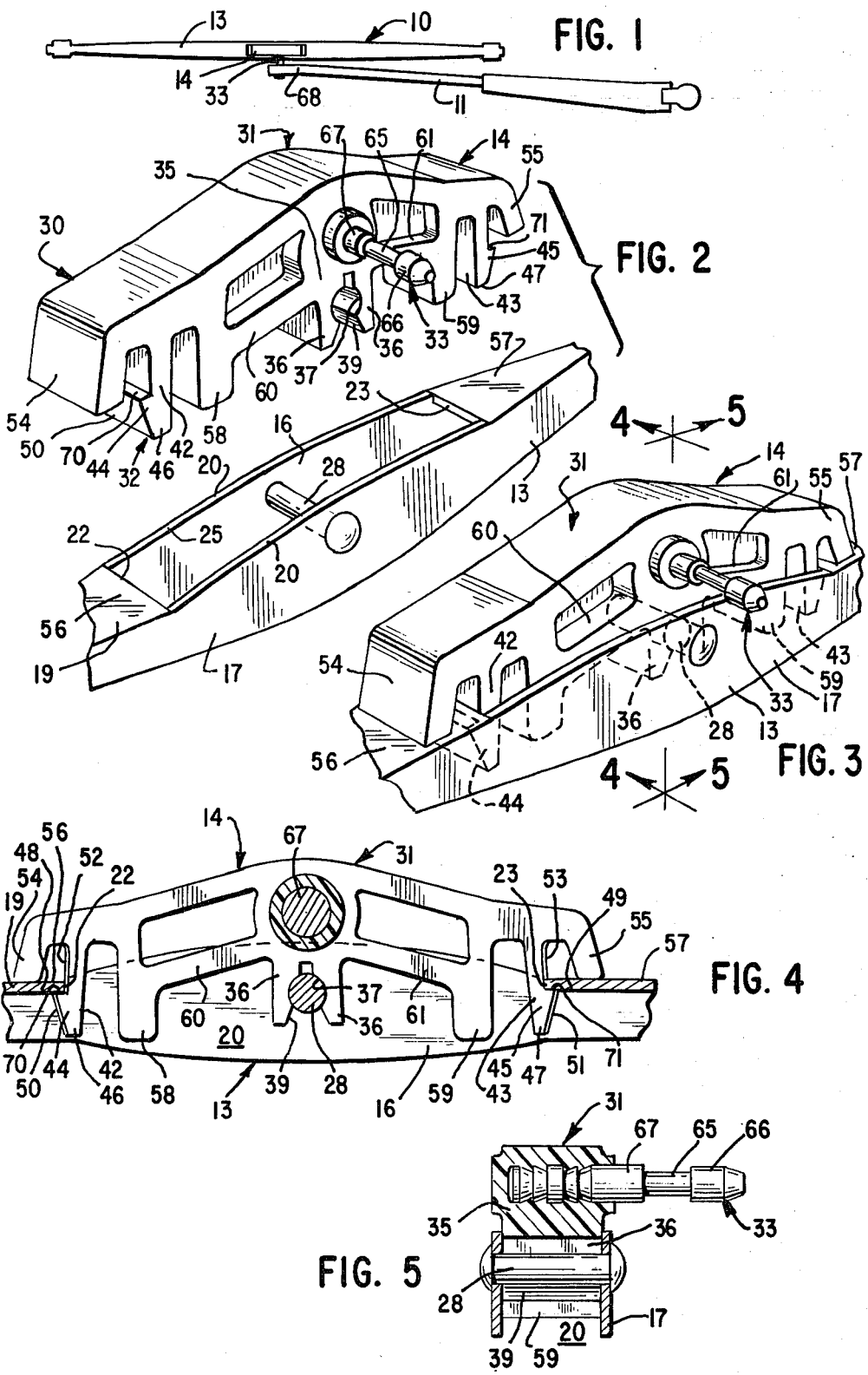

WINDSHIELD WIPER CONNECTING PIN ADAPTOR

DESCRIPTION

1. Technical Field

This invention relates generally to a windshield wiper assembly and, more particularly, to a connecting adaptor for converting a center mounted pin connection between a wiper arm and a blade to a side mounted pin connection.

2. Background Art

A windshield wiper assembly for automobiles, and the like, conventionally includes a wiper blade subassembly, a pressure-distributing superstructure subassembly, and a motor-driven wiper arm. The wiper blade subassembly generally includes a rubber-like wiping element connected to a backing strip or flexor. The pressure-distributing superstructure subassembly, which supports the flexor and hence the wiping element against the windshield surface, includes a primary yoke and optionally one or more secondary yokes. The wiper arm may be connected to the primary yoke by any one of a number of different methods which permit the wiper blade to be mounted pivotally relative to the wiper arm. The wiping element is thereby maintained in operative contact with the windshield as the wiper arm moves the wiper blade to and fro across the windshield that may have a varied contour.

Two connection methods are pertinent to the invention described herein. In the first of these connecting methods, the center mounted pin connection, the primary yoke defines a central opening across which a connecting pin or cross rivet extends transversely. The wiper arm has a terminal end which is positioned within the central opening and defines a hook-like structure adapted for releasable engagement with the cross rivet to pivotally mount the primary yoke to the wiper arm. In the second of the connection methods, the side mounted pin connection, the primary yoke has a connecting pin extending laterally outward from the yoke and the end of the wiper arm is connected to the extending connecting pin with the primary yoke thereby being mounted generally adjacent to the wiper arm.

The wiper blade and pressure-distributing superstructure are substantially the same in both of the aforementioned constructions. Nevertheless, because of the placement of the connecting pins on the respective primary yokes, two different wiper blade assemblies have to be made by the manufacturer and stocked in inventory by the retailer, if original equipment is to be replaced for any reason. The manufacture and inventory of two separate windshield wiper structures is not highly desirable nor highly profitable.

Adaptors enabling a yoke having a center mounted pin to be mounted on a wiper arm requiring a side mounted pin connection have been developed. One such adaptor has a body which has a side mounted pin and is secured in the yoke by locking tabs which engage the side walls. This adaptor has been unsuitable in some respects, however, since the locking tabs are partially exposed beneath the bottom edge of the side walls and, thus, susceptible to accidental unlocking. Further, the locking tabs are longitudinally oriented and, thus, have proven to make the adaptor more susceptible to both longitudinal shifting and rocking.

The present invention is directed to overcoming one or more of the problems as set forth above.

DISCLOSURE OF THE INVENTION

In one aspect of the invention, a connecting pin adaptor is provided for a windshield wiper assembly to convert a center mounted pin connection to a side mounted pin connection. The connecting adaptor is inserted within the central opening of the yoke over the cross rivet and is maintained in assembled position by deflectable claws which engage the center mounted pin and the shoulders at the ends of the opening in the yoke. The connecting adaptor carries a connecting pin which extends laterally outward beyond the side of the yoke to enable connection of the wiper arm adjacent the side of the yoke.

In a preferred embodiment of the invention, the connecting adaptor is configured to fit within the yoke open space and has at each longitudinal end a laterally disposed claw with locking tab which, together with a supporting flange, secures the adaptor to the yoke and prevents rocking motion therebetween. Aligning the locking tabs to engage the shoulders rather than the side walls enables the claws to be located within the yoke so as to be protected against accidental disengagement. Further, because the adaptor abuts all four sides of the open space of the yoke, the adaptor body is prevented from shifting in the yoke.

The utilization of a connecting adaptor constructed in accordance with the invention eliminates the necessity of manufacturing and stocking two different types of wiper blade assemblies. Thus, a reduction in cost results without a reduction in the effectiveness of the connection between the wiper arm and the yoke or the function of the windshield wiper assembly as a whole.

BRIEF DESCRIPTION OF THE DRAWINGS

FIG. 1 is a top plan view of a windshield wiper assembly incorporating a connecting pin adaptor constructed in accordance with the present invention;

FIG. 2 is an enlarged, exploded, perspective view of the center portion of the windshield wiper assembly of FIG. 1 showing an embodiment of the connecting pin adaptor;

FIG. 3 is an enlarged, perspective view of the center portion of the windshield wiper assembly similar to FIG. 2, but showing the adaptor in assembled position within the windshield wiper yoke;

FIG. 4 is a cross-sectional view of the adaptor and yoke taken along line 4—4 of FIG. 3; and FIG. 5 is a cross-sectional view of the adaptor and yoke taken along line 5—5 of FIG. 4.

BEST MODE FOR CARRYING OUT THE INVENTION

Referring to the drawings, and particularly to FIG. 1, a windshield wiper assembly, generally designated 10, to which the present invention generally pertains, is illustrated and is seen to broadly comprise a wiper arm 11 and a pressure-distributing superstructure including a bridge or yoke 13, which carries by conventional means a flexible wiper blade (not shown). The wiper arm 11 and the yoke 13 are interconnected by means of a connecting pin adaptor, generally designated 14, and described in detail hereinafter.

Referring to FIGS. 2 through 5, the yoke 13, which is made of metal or plastic, or of some similar substantially rigid material, is channel-shaped in cross section so as to resemble an inverted "U" having laterally disposed side walls 16,17 and a base or top wall 19. The enlarged midportion of the yoke 13 has a vertical open space 20 which is defined by the arcuate upper edges 25,26 of the side walls 16,17 and by the shoulders 22,23 at the edges of the base wall 19. Spaced from the arcuate upper edges 25,26 of the respective side walls 16,17 is a cross rivet 28 extending transversely between the side walls 16,17 within the open space 20.

To convert the yoke 13 from a center mounted pin connection to a side mounted pin connection, the connecting adaptor 14 is utilized. When the connecting adaptor 14 is placed on the yoke 13, the connecting adaptor 14 is positioned within the open space 20.

The connecting adaptor 14 is preferably formed from molded plastic material having sufficient inherent resiliency to allow temporary deflection of portions thereof. The connecting adaptor 14 is broadly comprised of a body 30, which includes a top portion 31 and a mounting portion 32 depending downwardly from the top portion 31, and a connecting pin 33 extending laterally outward from the top portion 31.

The mounting portion 32 generally has a transverse width substantially equal to the transverse width of the open space 20 defined between the inner surfaces of the side walls 16,17. The mounting portion 32 includes a center element 35 with two deflectable rivet claw elements 36. The inner surfaces 37 of the rivet claw elements 36 define a transverse bore adapted to receive and grasp the cross rivet 28 when the connecting adaptor 14 is mounted on the yoke 13, the bore being of a size and configuration which corresponds with the circular cross section of the cross rivet 28. The bottom surfaces 39 of the rivet claw elements 36 are tapered inwardly to a width less than the diameter of the cross rivet 28 so as to facilitate location of the cross rivet 28 therein. When the connecting adaptor 14 is assembled to receive the cross rivet 28 in the transverse bore, the rivet claw elements 36 deflect outwardly until the cross rivet 28 resides in the bore. Thereafter, the inherent resiliency of the body effects movement of the rivet claw elements 36 inwardly to lock the center element 35 on the cross rivet 28. The interaction of the cross rivet 28 with the rivet claw elements 36 prevents longitudinal movement of the connecting adaptor 14 within the open space 20.

A pair of longitudinally aligned claw elements 42,43 are disposed at the ends of the mounting portion 32 of the connecting adaptor 14. Both claw elements 42,43 extend transversely virtually the entire width of the opening, each having a longitudinally projecting locking tab 44,45 spaced from its lower edge 46,47, which tabs are adapted to engage the bottom edge 48,49 of the respective shoulders 22,23 when the connecting adaptor 14 is mounted in operative position within the open space 20. The locking tabs 44,45 extend outwardly from the respective claw elements 42,43 and when the claw elements 42,43 are in an undeflected condition, the locking tabs 44,45 of the pair of longitudinally aligned claw elements 42,43 span a distance greater than the longitudinal length of the open space 20 between edges or shoulders 22,23. Inclined cam surfaces 50,51 are defined between the lower edge 46,47 and the horizontal surfaces 70,71 of each of the locking tabs 44,45 so that when the connecting adaptor 14 is inserted downwardly into the open space 20, the shoulders 22,23 engage the cam surfaces 50,51 to deflect the structurally thin claw elements 42,43 inwardly. The connecting adaptor 14 is moved into the open space 20 until the locking tabs 44,45 move past the bottom edges 48,49 of the shoulders 22,23. When the locking tabs 44,45 are no longer biased or flexed inwardly by contact with the shoulders 22,23, the inherent resiliency of the claw elements 42,43 will effect movement of the locking tabs 44,45 longitudinally outward into position with the horizontal surfaces 70, 71 below and in engagement with the bottom edges 48,49 of the shoulders 22,23. In this position, the locking tabs 44,45 prevent upward movement of the connecting adaptor 14 out of the open space 20. When the locking tabs 44,45 are engaged, the respective outer surfaces 52,53 of the claw elements 42,43 lie flush with the edges or shoulders 22,23 as seen in FIG. 4.

The adaptor top portion 31 has flanges 54,55 on each end which abut the top surfaces 56,57 of the shoulders 22,23 to limit movement of the connecting adaptor 14 into the open space 20. The bottom of the flanges 54,55 and the top of the locking tabs 44,45 are vertically separated by a distance substantially equal to the thickness of the shoulders 22,23. Thus, when further downward insertion of the connecting adaptor 14 is prevented by engagement between the flanges 54,55 and the top surfaces 56,57 of the shoulders 22,23, the locking tabs 44,45 have moved past the bottom edges 48,49 of the shoulders 22,23 with the horizontal surfaces 70,71 in contact therewith. In this position, (FIGS. 3 through 5), the locking tabs 44,45, because of the resiliency of the claw elements 42,43, have moved laterally outward to a position directly below the respective bottom edges 48,49 to effectively lock the connecting adaptor 14 in operative assembled position within the open space 20. Thus, the locking tabs 44,45 and flanges 54,55 rigidly secure the connecting adaptor 14 to the yoke 13, preventing relative movement therebetween. Further, the connecting adaptor 14 is secured in a position where the claw elements 42, 43 are entirely within the confines of the open space 20 (i.e. do not extend below the side walls 16,17). The claw elements 42,43 are thus protected from being accidentally deflected and unlocked.

Positioned on each side of the center element 35 is a transverse positioning wall 58,59. The positioning walls 58,59 have a width substantially equal to the transverse width of the open space 20 between the inner surfaces of the side walls 16,17. Thus, the positioning walls 58,59 maintain the connecting adaptor 14 in proper lateral position within the open space 20. Further, the structurally thick positioning walls 58,59 prevent collapse of the yoke side walls 16,17 and collapse of the connecting adaptor 14 itself. Stiffening members 60,61 are secured between the center element 35 and the positioning walls 58,59, giving the connecting adaptor 14 longitudinal stiffness. This keeps the connecting adaptor 14 from bowing and thereby ensures that the locking tabs 44,45 and flanges 54,55 maintain a secure grip on the shoulders 22,23, further ensuring that the connecting adaptor 14 can neither shift longitudinally nor rock on the cross rivet 28.

When it is desired to remove the connecting adaptor 14 from the yoke 13, the claw elements 42,43 are manually deflected forcefully inward to disengage the horizontal surfaces 70,71 of locking tabs 44,45 from the shoulders 22,23 and the connecting adaptor 14 is thereafter lifted out of the open space 20. Forcefully lifting the connecting adaptor 14 causes the rivet claw elements 36 to deflect to allow the cross rivet 28 to disengage from the bore defining inner surfaces 37.

Referring to FIGS. 3 through 5, it is seen that the connecting pin 33 extends from the upper portion of the center element 35. The connecting pin 33 may optionally be made of metal and suitably anchored within the adaptor top portion 31. When the connecting adaptor 14 is locked within the yoke open space 20, the connecting pin 33 passes above the upper edge of the side wall 17. The adaptor 14 is symmetrical and can be reversed relative to the yoke 13 so that the pin projects over the edge of side wall 16. This is important for blades that are not symmetrical about the cross rivet 28 so that the blade can be used on the left or right side of the windshield. The connecting pin 33 has a circular cross section and includes a constricted segment 65 flanked on each axial side by an enlarged segment 66,67. The wiper arm 11 has a terminal end 68 with a latch adapted to engage the connecting pin 33. The enlarged segments 66,67 of the connecting pin 33 prevent axial disengagement of the wiper arm 11 in a manner well known in the art.

Industrial Applicability

From the foregoing, it should be apparent that the connecting adaptor provides a convenient means for converting a wiper blade center mounted pin connection to a side mounted pin connection. As a result, one wiper blade design can be utilized with a wiper arm requiring a center pin connection or with a wiper arm requiring a side pin connection.

Other aspects, objects and advantages of this invention can be obtained from a study of the drawings, the disclosure and the appended claims.

We claim:

1. In a wiper blade assembly (10) with a yoke (13) having a pair of spaced lateral walls (16,17) defining an opening (20) therebetween having a shoulder (22,23) at each end and a cross rivet (28) extending between the lateral walls (16,17) within the opening (20) and providing a center mounted pin connection for a wiper arm (11), a connecting pin adaptor (14) for converting the cross pin connection to a side mounted pin connection comprising a body (30) having a top portion (31) and a mounting portion (32), and a connecting pin (33) having an axis extending laterally outward from said top portion (31), said connecting pin being adapted for connection to a wiper arm (11), said mounting portion (32) having a transverse slot (37) in the midportion adapted to receive the cross rivet (28) therein and a pair of deflectable claws (42,43) depending from opposite ends of said top portion (31), each deflectable claw having a portion (44,45) facing in a direction transverse to the axis of the pin and adapted to engage one of said shoulders (22,23), whereby the mounting portion (32) of the connecting adaptor (14) is inserted into the opening (20) over the cross rivet (28) with the claws (42,43) being deflected longitudinally inward until the claw portions (44,45) deflect outwardly to engage the shoulders (22,23) to hold the adaptor (14) in position with the connecting pin (33) extending laterally from the yoke (13) above one lateral wall thereof.

2. The wiper blade assembly (10) of claim 1 wherein said mounting portion (32) has two claw elements (36) depending downwardly from said top portion (31) and defining said slot 37, said claw elements (36) being made of resilient material and being deflectable for receiving said cross rivet (28) in said slot (37), and said top portion (31) has flanges (54,55) at each end extending beyond the length of the opening (20).

3. The wiper blade assembly (10) of claim 2 wherein said claw portions (44,45) are tabs extending longitudinally outward with the vertical distance between the tops of said tabs (44,45) and the bottoms of said flanges (54,55) being substantially equal to the thickness of the shoulders (22,23) whereby the tabs (44,45) engage the bottom (48,49) of the shoulders (22,23) and the flanges (54,55) engage the top (56,57) of the shoulders (22,23) with the adaptor (14) seated in the yoke (13).

4. The wiper blade assembly (10) of claim 3 wherein the distance spanned by tabs (44,45) of the longitudinally aligned claws (42,43) being greater than the length of the opening (20) and the distance spanned by the longitudinally aligned claw portions free of tabs being substantially equal to the length of the opening (20).

5. The wiper blade assembly (10) of claim 1 wherein said mounting portion (32) includes a plurality of transverse walls (58,59) depending downwardly from said top portion (31), one being disposed adjacent and substantially parallel to each claw (42,43), said walls (58,59) having a lateral width substantially equal to the width of the opening (20), and a center portion (35) which defines said slot (37).

6. The wiper blade assembly (10) of claim 5 wherein said mounting portion (32) further includes longitudinal stiffening members (60,61) secured between said transverse walls (58,59) and said center portion (35), said stiffening members (60,61) ensuring that the adaptor body (30) does not deflect along a transverse axis.

7. In a wiper blade assembly (10) with a yoke (13) having a pair of spaced lateral walls (16,17) defining an opening (20) therebetween having a shoulder (22,23) at each end and a cross rivet (28) extending between the lateral walls (16,17) within the opening (20) and providing a center pin connection for a wiper arm (11), a connecting pin adaptor (14) for converting said center pin connection to a side pin connection comprising a body (30) having a top portion (31) and a mounting portion (32) and a connecting pin (33) extending laterally outward from said top portion (31) and being adapted for connection to a wiper arm (11), said mounting portion (32) including flanges (54,55) at each end extending beyond the length of the opening (20) in the yoke, a center element (35) depending from the top portion (31) and having a slot (37) defined in the bottom thereof for receiving the cross rivet (28), a plurality of deflectable claws (42,43) depending from said top portion (31) each having a locking tab (44,45) extending longitudinally outward and adapted to engage the bottom (48,49) of the shoulders (22,23) with a laterally aligned claw (42,43) being disposed at each longitudinal end of the opening (20), and a plurality of transverse walls (58,59) depending from said top portion (31) disposed at opposite longitudinal ends of said body (30), whereby the mounting portion (32) of the connecting adaptor (14) is inserted into the opening (20) over the cross rivet (28) with the claws (43,43) being deflected longitudinally inward until the claw tabs (44,45) deflect outwardly to engage the bottom (48,49) of the shoulders (22,23) to hold the adaptor (14) in position with the connecting pin (33) extending laterally from the yoke (13) above one lateral wall thereof.

8. The wiper assembly (10) of claim 7, wherein said flanges (54,55) engage the top of said shoulders (22,23) when the claw tabs (44,45) engage the bottom (48,49) of said shoulders (22,23).

* * * * *